July 10, 1923.

J. D. LACROIX 1,461,125

FABRIC STITCHING DEVICE

Filed May 18, 1921

INVENTOR
JOSEPH D. LACROIX
BY: R.H. Waters.
ATTORNEY

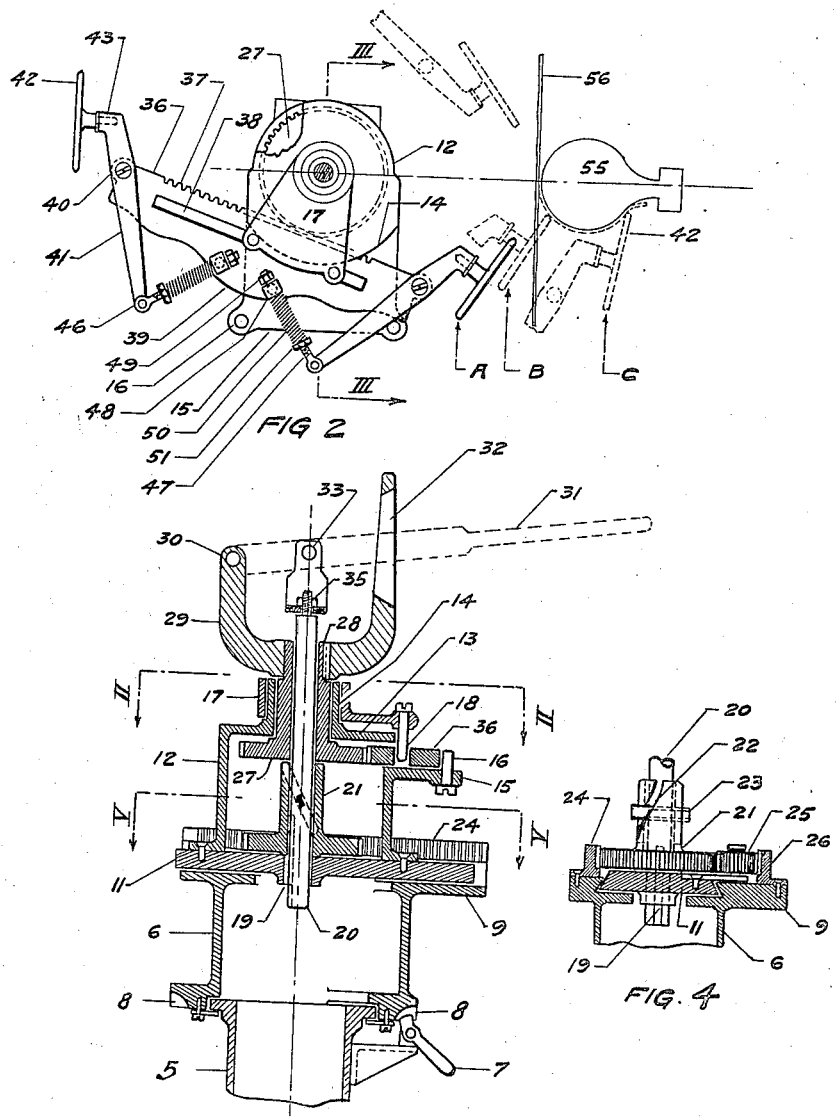

July 10, 1923.

J. D. LACROIX 1,461,125

FABRIC STITCHING DEVICE

Filed May 18, 1921

INVENTOR

JOSEPH D. LACROIX

BY:

ATTORNEY.

Patented July 10, 1923.

1,461,125

UNITED STATES PATENT OFFICE.

JOSEPH D. LACROIX, OF NEW ORLEANS, LOUISIANA, ASSIGNOR TO KELLY-SPRINGFIELD TIRE COMPANY, OF AKRON, OHIO, A CORPORATION OF NEW JERSEY.

FABRIC-STITCHING DEVICE.

Application filed May 18, 1921. Serial No. 470,681.

*To all whom it may concern:*

Be it known that I, JOSEPH D. LACROIX, a citizen of the United States, residing at New Orleans, in the parish of Orleans and State of Louisiana, have invented certain new and useful Improvements in a Fabric-Stitching Device, of which the following is a specification.

This invention relates to an appliance employed in the manufacture of casings for automobile tires, and concerns specifically the means for shaping the several plies of superposed material, comprising the main structure of the casing, about a revolving core upon which the plies are successively placed. The invention is intended to perform that operation, known in the art as "Stitching", the disk element being termed a "stitcher disk", or abbreviated, a "stitcher".

The present invention is particularly designed to operate in conjunction with the means for supporting the unapplied material from the core, shown in my co-pending application for a tire forming machine, Serial No. 461,997, but is equally suitable for use in combination with any conventional machine, or means, for applying the material on the core.

The usual material comprising tire casings is either cross-woven fabric, or cord, the latter being material composed of parallel loosely-bound strands; in either case the material is coated with unvulcanized rubber, or the like, cut on the bias into appropriate strips of sufficient length to encompass the periphery of the core upon which it is to be formed, and ultimately stitched-down thereon. In the stitching operation the edges of the material must be gradually compressed radially inward about the core and made to conform with its sectional contour. This operation involves the exercise of great skill and the employment of appliances adapted to perform the work with the utmost accuracy and efficiency, else the material will be caused to buckle, wrinkle, or especially in the case of cord, to separate.

In the process of applying the strips of material, and in order that they shall be tightly drawn over the core at substantially a uniform tension and at the same time be gradually compressed toward their edges, it has been found necessary to apply the "stitcher disk" at an angle to the normal surface of the core, so that, at the line of contact of the "stitcher" therewith, a slight sliding or "wiping" effect is set up. Heretofore it has been generally customary to use a smooth-edged stitcher disk which tends to intermittently cling to and then slip over the material being pushed ahead of its line of friction, resulting thereby in setting up irregular crowding, or bunching, of the tire forming strips,—defects which are difficult to overcome by subsequent rolling, and indeed, frequently permitted to remain in the casing, to its detriment. Furthermore it is noted that, when cord is laid as the body structure, the direction of the strands is oblique of the core, that is, in general made to assume helical paths due to the bias cutting of the strip in the first instance. In the stitching of cord it has been found necessary to apply the stitcher in the direction of the cords in contradistinction to application transverse of their path—this for the reason that the cords are easily separated by a friction contact across them. The stitching of cord is particularly difficult in view of its inherent tendency to separate; and the crowding up and slipping action thereon of a smooth-edged stitcher disk is highly destructive of the uniformity required.

One of the principal objects of my invention is to perfect a means for stretching the material and compressing the edges in a manner insuring against the defects named; to this end I have provided a fluted-edged disk with a well-defined sawtoothed periphery, the function of which is to cause the material to assume small regular folds, or crimps, during the compression thereof, which irregularities are, of course, gradually smoothed out by the subsequent passage of the disk over them.

A further object is to provide a stitcher disk that will perform its work efficiently and positively with the minimum demand on the personal dexterity and judgment of the operator, thus permitting the employment for that operation, of those of small skill.

A still further object is the provision of a mechanical control of the stitcher disk, capable of manipulation through a single lever, to attain all variations required in the full performance of the operation.

With these and other objects, more fully appearing herein, the invention consists in the new and useful combination of features set forth, disclosed and claimed.

Figure 2 is a top view on line II—II of Figure 3, particularly showing the stitcher at the beginning of the operation, and in dotted lines, the progressive positions of the stitcher during the advance—also its position when shifted to the opposite side of the core.

Figure 3 is a partial sectional elevation taken in a vertical plane parallel to the length of the transverse slide.

Figure 4 is a partial sectional elevation transverse of the length of the transverse slide.

Figure 5 is a section through the horizontal plane V—V of Fig. 3, showing the rack and pinion gear for effecting transverse adjustment.

Figure 1:
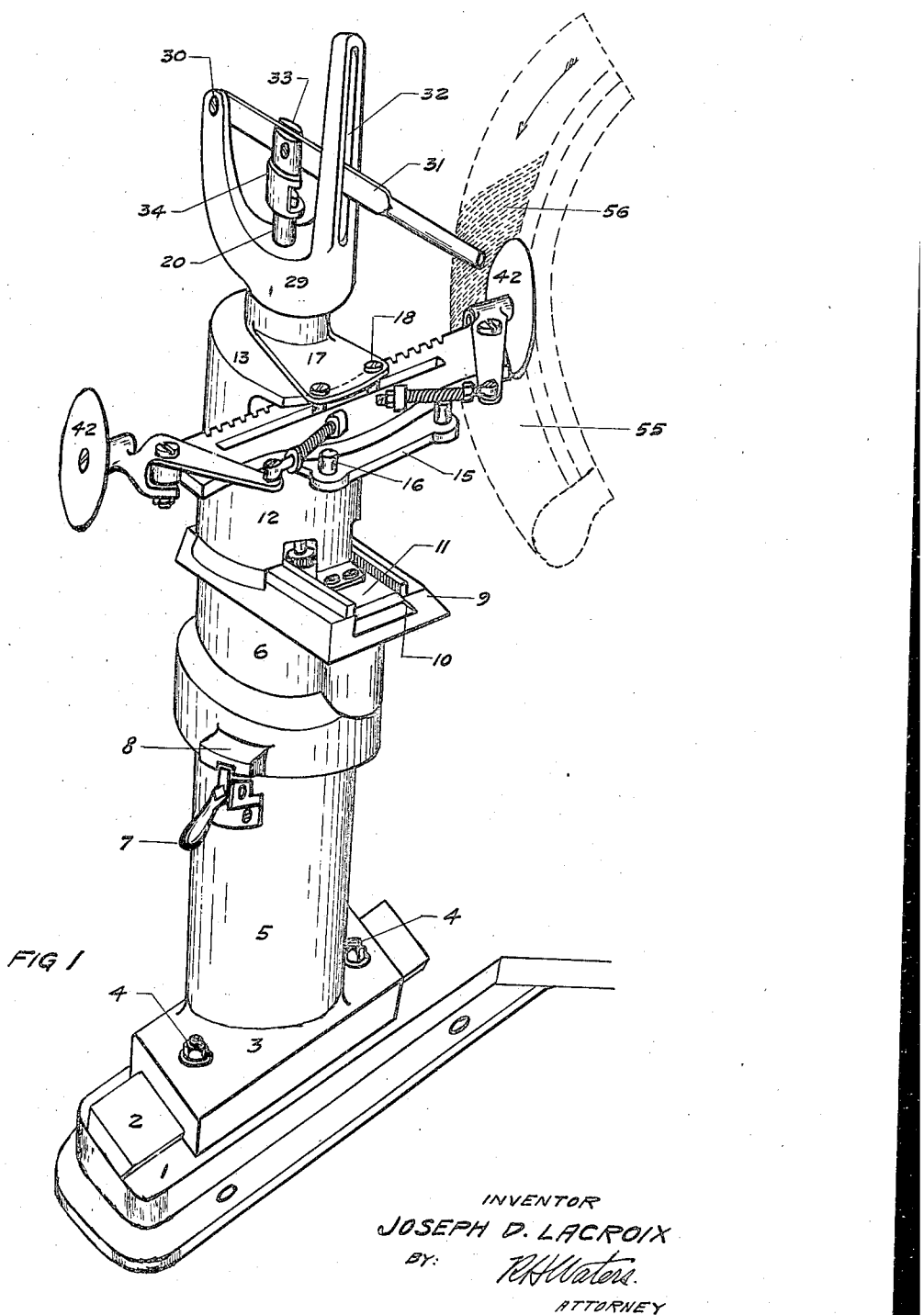
Figure 1 is a perspective view showing the general assembly, and the relative position of the device to the revolving core upon which the tire is being formed.

Referring specifically to the drawings, which are illustrative of a preferred form for practicing this invention:

On the bed plate 1, which is usually integral with the tire forming machine with which this invention is associated, is a dovetail slide 2 in which is contained the slidable block 3, locked thereon in any desired position by set bolts 4. Fashioned with the block 3 is the fixed portion of the pedestal 5, upon which is mounted the rotatable portion 6 of the pedestal, this being the intermediate portion thereof. (See Figs. 1 and 3.) By rotating 6 either stitcher may be alternatively applied to opposed sides of the rotating core, it being noted that a latch 7 is provided on the base 5 and adapted to engage counterpart stop members 8 located substantially opposite each other on the rotatable part 6. The upper end of 6 is fashioned to form a slide table 9 having thereon a dovetail slot 10 within which is slidably locked a slide 11. Securely attached to slide 11 is a housing 12, having a flat top portion comprising a horizontal quadrantal extension 13 and an annular sleeve-like extension 14 rising axially therefrom. Below the extension 13 and parallel thereto is a second extension, or lip, 15 having at its extreme corners stop-pins 16, which will presently be explained. Rotatably journaled on 14 is a swinging keeper 17 having within its free ends a pair of fixed pins 18 extending downwardly clear of and below the edge of the quadrant extension 14 (see Figs. 2 and 3).

Passing upwardly within slide 11 and slidably, but non-rotatably keyed thereto at 19, is a cam shaft 20, on which is mounted a spur gear 21 having an elongated shank in which is cut a spiral cam slot 22 and through which passes a key 23 driven through the shaft 20. The teeth of 21 mesh directly with a rack 24 on part 9 and with an intermediate pinion 25 suitably journaled on slide 11 and in turn meshing with a rack 26 also fixed on part 9; this gearing provides equality of effort upon the respective racks when the gear 21 is partially rotated by the axial drift of the shaft 20 within the elongated shank containing the spiral cam slot, thus effecting a smooth motion of the slide 11 with its associate gearing.

Immediately above gear 21 and journaled for unrestricted revolution on shaft 20, is a gear 27 having a shank portion extending upwardly of the sleeve 14, on the housing and non-rotatably keyed at 28 to the bushing of a revoluble yoke 29; thus trasmitting revolution of the yoke to the gear 27. On one arm of the yoke at 30 is fulcrumed a control lever 31, the free end of which passes through a confined slot 32 in the other arm of the yoke. The lever 31 is pinned at 33 to suitable lugs on the swivel 34 which is rotatably associated with the end of shaft 20 by a reduced threaded end thereof capped by a nut 35. A vertical movement of lever 31 will operate to displace the shaft 20 axially, through the swivel connection, thereby causing gear 21, to actuate the slide 11; the purpose of which action will be hereafter explained.

Figure 8:
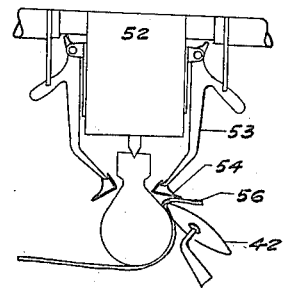
Figure 9:
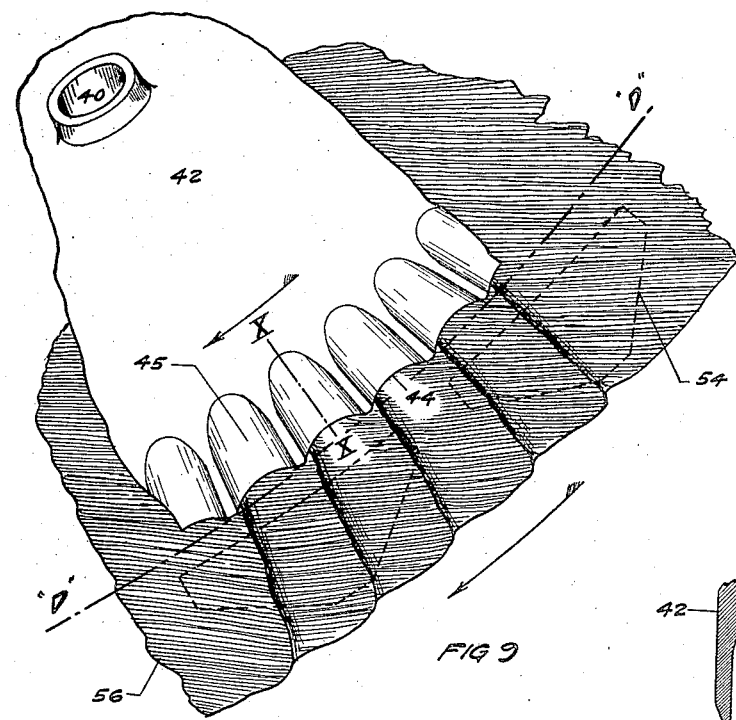
Figure 9 is an enlarged view of the stitcher, particularly showing a portion of the material being laid thereby; the regular crimps, or folds, worked into the material by the edge of the stitcher, being emphasized for the purpose of illustration.
Figure 10:
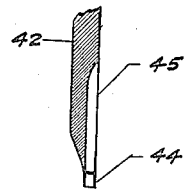
Figure 10 is a section along line X—X of Fig. 9 showing the general formation of the edge of the stitcher disk.

Slidable on extension 15, and between 13 and 15, is an extension bar 36 having a rack portion 37 held in constant engagement with the teeth of gear 27 by reason of engagement of pins 18, dependent from the swinging keeper 17, in a slot 38. The outer edge of 36 is cut in the form of a cam surface 39 adapted to contact with, and be limited in its free swing by, pins 16 in extension 15. (The function of this cam edge will hereafter be explained.) Pivotally mounted at 40 on the extremities of 36 are a pair of counterpart stitcher arms 41 each having on one end thereof a stitcher disk 42 which is suitably journaled at 43 for free rotation. The periphery of the disks 42 are fashioned with regular flutes, on teeth, 44 and between the teeth, and extending a substantial distance into and radially inwardly of the face of the disk are, reentrant, or scored out portions 45, provided in order that the peripheral edge of the disk shall at all points, maintain substantially the same width of contact, also a further object of these scored out portions is to provide space for the crimped material to be folded up into when the stretcher has assumed a sharp angle with respect of the face of the core and the surface of the material as supported by the underlying arms on the tire forming machine—for an illustration of this action see particularly Fig. 8, wherein the stitcher is working within an acute angle with respect of the material being laid down. Fig. 9, also suggests this action when the outlying crimped edges of the fabric are folded up against the face of the stitcher disk along the theoretical line "D—D" of parting of the applied and unapplied material with the core. It being noted that the view in Fig. 9 is warped out of true perspective for the purpose of better illustrating he crimping at the point of greatest compression of the material—namely at its edge (Fig. 8 shows the edge beyond line "D—D" of Fig. 9 folded up).

The end of stitcher arm 41 at 46 is pinned to the end of a bolt 47 which is slidably confined within a swivel block 48 attached to bar 36 and retained therein by a suitable nut 49. The axial slide of bolt 47 within block 48 is resiliently controlled by a spring 50, the tension being regulated by a nut 51.

The tire building machine is indicated generally by 52, the arms for supporting the unapplied fabric, and which recede radially as the stitcher advances, by 53, and the fabric support palms on the ends of said arms by 54. The revolving core on which the material is laid is indicated by 55 and the fabric ply being operated upon by 56.

Figure 6:
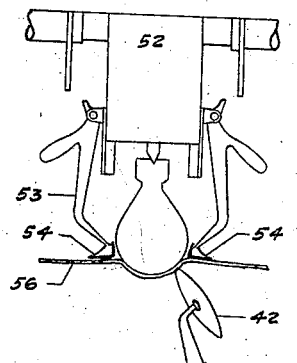
Figures 6, 7 and 8 are diagrammatic views, in general indicating the advance of the stitcher in laying one side of the core; also showing the particular means for supporting the unapplied material characteristic of the tire forming machine with which this invention works to great advantage.

The operation of the device follows:—The slide block 3 is first adjusted to properly relate the range of advance of the extension bar 36, carrying the stitcher 42, with the particular core on which material is to be laid. Next the proper transverse adjustment of the slide 11, with its associated gearing, is effected to relate the contact of the stitcher with the contour of the core 55; this adjustment being readily made by simply manipulating the control lever 31 vertically. In Fig. 2 the sticher 42, adjacent the core, is approximately in position for a final adjustment to bring it into initial operating contact with the work; that is, by a slight movement of lever 31 and a small advance of the bar 36 the stitcher will be moved from position "A" to position "B" which is the point of starting (see Fig. 6). Radial advance of the stitcher over the core is attained by swinging the lever 31, which, through its associated gearing, and quite independently of the transverse adjustment effective by vertically moving the lever, will advance the bar 36 with its connected stitcher. It will be noted that the initial setting of the stitcher against the core (see Fig. 2—position B) should be made with such pressure of the stitcher there against as will swing the stitcher arm slightly about its fulcrum 40, thus compressing its balance spring 50 in a manner productive of a resilient compression of the stitcher against the core. This reacting pressure will tend to swing the end of the bar 36 away from the core but its movement is restrained by pin 16 contacting with the cam-shaped edge 39, thereof.

Figure 7:
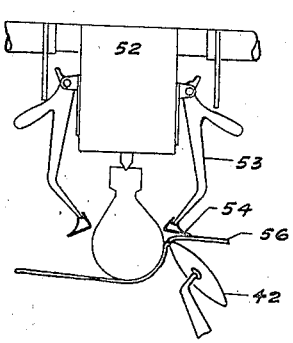

Advance of the stitcher radially of the core is attained by manually pushing on lever 31, thus running out the bar 36 at the will of the operator. As the advance proceeds from "B to C" Fig. 2, (see also Figs. 6, 7 and 8) in a degree related to the recession of the fabric support palms 54 and under the constant control of the operator, the stitcher will conform to the changing contour of core by reason of the action of the cam edge 39 on bar 36, not only causing the disk 42 to assume a favorable angle with respect to the changing contour of the core but insuring that the initial tension against the core will be maintained without requiring the operator to further adjust the transverse slide 11. Of course, the control of advance and of lateral adjustment, being in the respective horizontal and vertical movements of the single lever, can be varied at the will of the operator at all stages of the advance.

As previously explained it is of advantage to stitch cord fabric in the direction of its path, I have therefore illustrated in Fig. 1 the core revolving in the direction of the arrow during the laying of a cord material whose direction on the near side of the core, is indicated in dotted helical lines. When it is desired to lay the opposite side of the core the stitcher device is rotated, as previously explained, to bring the other disk into play; it being customary to reverse the direction of rotation of the core to attain favorable related paths of the cord with the direction of application of the stitcher.

While the disclosure herein has called particular attention to the laying of cord material, and while a tire forming machine has been illustrated in combination herewith and featuring support means for the unapplied material, it will be understood that I do not limit my invention to the illustrative examples of its application in the art, nor to the exact mechanism disclosed in its embodiment in the form of an operable machine.

I claim:

1. In a stitcher mechanism a freely rotatable disk having its periphery fashioned with regularly formed arcuate serrations, one face of said disk having a bevel along its periphery, the opposite face of said disk having scored-out depressions coincident with the arcuate serrations, said depressions being deepest at the crown of the arcuate serrations, for the purpose set forth.

2. The combination with a tire forming machine, comprising, a revoluble core adapted to support tire forming material thereon; of a stitcher element, comprising a pedestal movable toward and away from the core, a housing on the pedestal adapted to be transversely adjusted with respect to the core, a radially advanceable stitcher carriage having a disk thereon, and a unitary control lever whereby the said transverse and radial movements are effectuated by, respectively, vertical and horizontal motions on said lever.

3. A stitcher device, comprising; a pedestal, slidably mounted on a base; a revoluble portion on the pedestal having a lock thereon; a slide on the revoluble portion; a housing slidably retained within the slide, said housing comprising a stitcher carriage having a disk thereon, and centralized means within the housing whereby the housing is manually moved within the slide and the stitcher carriage advanced.

4. A stitcher device, comprising: a housing adapted to be moved transversely within a slide; a carriage on the housing having a stitcher disk thereon, said disk having a beveled and fluted edge; a unitary control having means associated therewith for traversing the housing and advancing the carriage radially of a juxtaposed core.

5. The combination with a revoluble core adapted to support tire forming material thereon; of a stitcher element, comprising, a pedestal-supported housing adapted to be adjusted transversely with respect to the plane of rotation of the revoluble core, a stitcher bar carriage slidably mounted on said housing and having stitcher disks resiliently mounted on its ends, and a unitary control lever having means coacting with housing and stitcher bar moving means whereby the housing and stitcher bar may be selectively or simultaneously moved within their respective limits of travel.

6. The combination with a revoluble core adapted to support tire forming material thereon; of a stitcher element, comprising, a horizontally slidable housing adapted to be positioned transversely with respect to the plane of rotation of the revoluble core, a stitcher bar carriage slidably mounted on said housing and having stitcher disks resiliently mounted on its ends, and a unitary control lever having means coacting with housing and stitcher bar moving means whereby a force applied with a component of less than ninety degrees to the horizontal will simultaneously slide the housing and rotate the stitcher bar carriage.

7. The combination with a revoluble core adapted to support tire forming material thereon; of a stitcher element, comprising, a horizontally slidable housing adapted to be positioned transversely with respect to the plane of rotation of the revoluble core, a stitcher bar carriage slidably mounted on said housing and having stitcher disks resiliently mounted on its ends, and a unitary control lever having means coacting with housing and stitcher bar moving means whereby the housing or the stitcher bar may be moved independently or simultaneously by differently applied forces on said unitary control lever.

In testimony whereof I affix my signature.

JOSEPH D. LACROIX.